Figure 1:
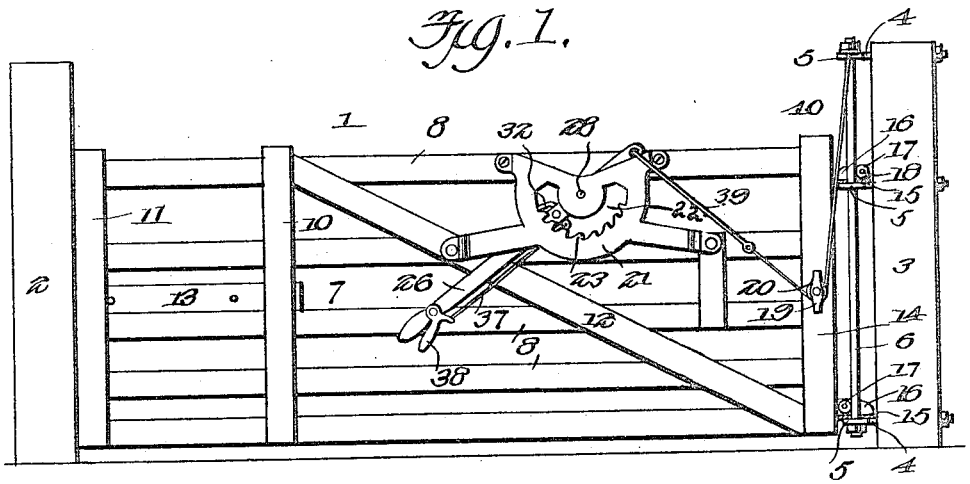

R. GILES.
GATE.
APPLICATION FILED AUG. 29, 1916.

1,213,623.

Patented Jan. 23, 1917.
2 SHEETS—SHEET 1.

Witness
Hugh H. Ott

Inventor
R. Giles,
By Victor J. Evans
Attorney

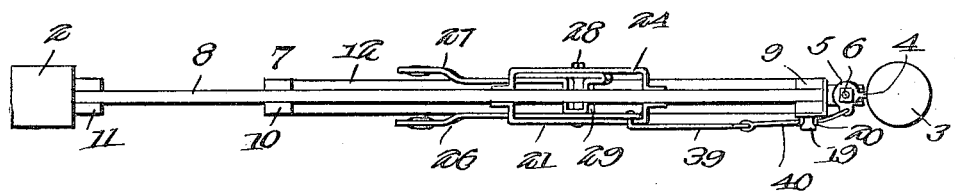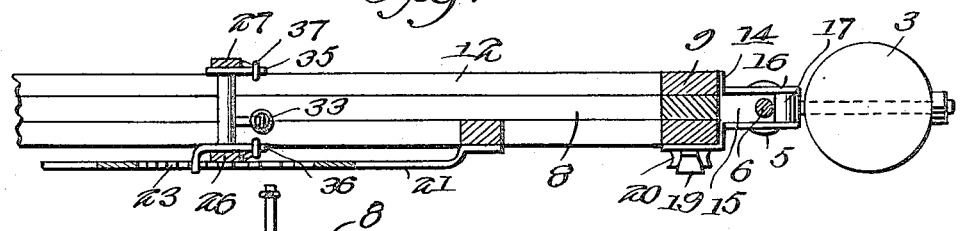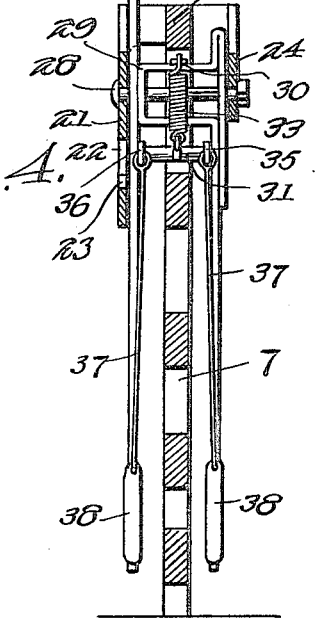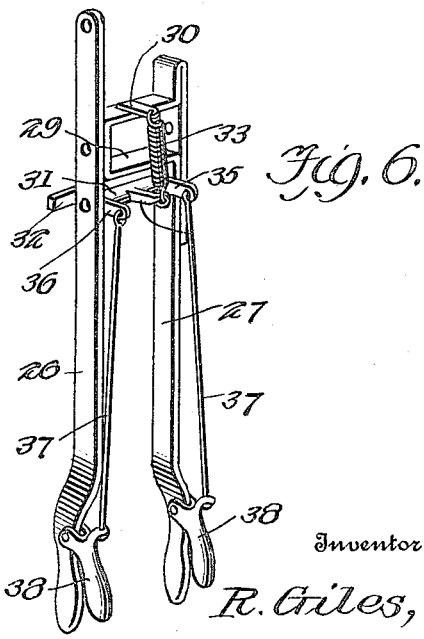

UNITED STATES PATENT OFFICE.

ROY GILES, OF ASSUMPTION, ILLINOIS.

GATE.

1,213,623.　　　Specification of Letters Patent.　　Patented Jan. 23, 1917.

Application filed August 29, 1916. Serial No. 117,516.

*To all whom it may concern:*

Be it known that I, ROY GILES, a citizen of the United States, residing at Assumption, in the county of Christian and State of Illinois, have invented new and useful Improvements in Gates, of which the following is a specification.

This invention relates to a gate and more particularly to a gate which is especially adapted for use upon farms, and the like.

The primary object of the invention is to provide a gate of the class described which may be hingedly connected with a gate post and is provided with raising mechanism for connection with said post and adapted when operated to raise the gate vertically upon the post and hold the same in adjusted position thereon so that the gate may be swung over snow banks, ruts, and the like, which would otherwise obstruct the movement of the gate to open position.

Another object of the invention is to provide a gate of the class described in which the raising mechanism mounted upon the gate and having connection with the post with which the gate is hingedly connected may be operated from either side of the gate.

A further object of the invention is to provide a gate of the class described in which a flexible element having connection with the post to which the gate is hingedly connected is trained over a pulley on the gate and connected with levers pivotally connected with a rack frame mounted upon the gate, so that when said levers are turned about their pivotal connection with the frame, the gate may be raised or lowered upon the post to establish communication between adjacent inclosures without necessitating the gate being swung on its hinges to open position.

With these and other objects in view, the invention resides in the novel combination and arrangement of parts, which will be hereinafter described and particularly pointed out in the claim.

The preferred embodiment of the invention has been illustrated in the accompanying drawings, although no restriction is necessarily made to the precise details of construction therein shown, as changes, alterations, and modifications, within the scope of the claim may be resorted to when desired.

Figure 2:
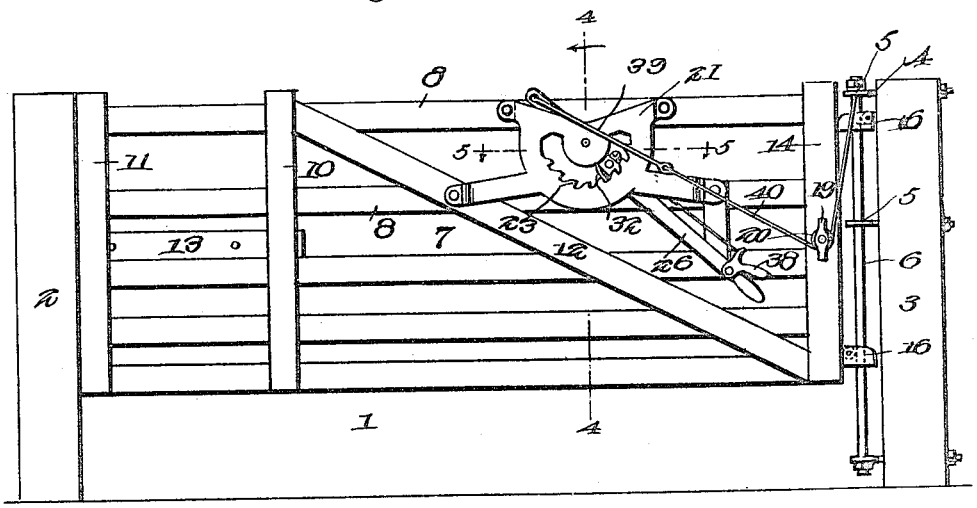

Like characters of reference denote corresponding parts throughout the several views in the drawings, in which:

Figure 1 is a side elevation of a gate constructed in accordance with the invention and showing the gate in normal position. Fig. 2 is a view similar to Fig. 1 showing the gate in raised position. Fig. 3 is a top plan view of the gate as shown in Fig. 1 in the drawing. Fig. 4 is a vertical transverse sectional view on the line 4—4 of Fig. 2. Fig. 5 is a horizontal transverse section on the line 5—5 of Fig. 2. Fig. 6 is a detailed perspective view of the levers associated with the gate raising mechanism.

Referring now to the drawings in detail, the numeral 1 designates a gate way formed by spaced gate posts 2 and 3, said gate post 3 having extending laterally therefrom bearing members 4 through the heads 5 of which is passed a rod 6 arranged in a plane parallel to the gate post 3 and held in spaced relation thereto by the bearing members 4.

A gate 7 for closing the gate way 1 is arranged between the posts 2 and 3 and comprises horizontal rails 8 held in spaced relation by pairs of spaced battens 9, 10, and 11, said pairs of battens 9 and 10 having extending diagonally therebetween struts 12 also connected with the horizontal rails 8 of the gate 7.

A latch bar 13 is supported upon one of the horizontal rails 8 and has its ends arranged between the pairs of battens 10 and 11, so that said bar may be slid on said horizontal rail to cause one end thereof to extend beyond the battens 11 to be received in a slot in the gate post 2.

Secured to one of the battens 9 is a plate 14 L-shaped in cross section and provided upon one side thereof with spaced arms 15 through openings in which is passed the rod 6 to hingedly connect the gate with the gate post 2, said arms having formed on the sides thereof flanges 16 receiving therebetween rollers 17 mounted on shafts 18 journaled in the flanges 16, said rollers being arranged upon opposite sides of the rod 6 and serve to prevent the arms from binding upon the rod 6 so that the gate may be raised in a vertical direction. Secured to the other side of the plate 14 between its ends is a bracket 19 having mounted thereon a pulley 20.

Arranged between the battens 9 and 10 upon one side of the gate and secured to the horizontal rails 8 and diagonally extending struts 12 in any suitable manner is a rack frame 21 having an arcuate opening 22 therein one wall of which is provided with teeth 23. Arranged upon the other side of the gate 7 and secured to the top horizontal rail thereof in alinement with the rack frame 21 is a bracket 24 between which and the rack frame 21 is arranged spaced levers 26 and 27 mounted to turn on a fulcrum rod 28, the ends of which are journaled in the bracket 24 and rack frame 21, said levers 26 and 27 being arranged upon opposite sides of the gate 7 and connected through the medium of a yoke 29 formed from one end of the lever 27, said yoke having formed thereon an ear 30.

A rock shaft 31 which is arranged below the yoke 29 has its ends mounted to turn in the levers 26 and 27 and has mounted thereon adjacent the lever 26 a locking dog 32 one end of which is normally held in engagement with the teeth on the rack frame 21 by a contractile spring 33 having one end thereof connected with an arm 34 on the rock shaft and its other end secured in the ear 30 on the yoke 29, said rock shaft having mounted thereon adjacent the lever 27 an arm 35 corresponding to an arm 36 on the dog 32. Each of the arms 35 and 36 has connected therewith a link 37, the other end of which has connection with a pivoted hand grip 38 on the levers 26 and 27 so that pressure upon either of the hand grips will rock the shaft 31 and release the dog 32 from engagement with the teeth 23 on the rack frame 21 against the influence of the spring 33 thereby permitting the levers 26 and 27 to be simultaneously turned about their pivotal connection with the bracket 24 and rack frame 21.

Pivotally connected with the end of the lever 26 which extends above the rack frame 21 is one end of a link 39 the other end of which has connected therewith an end on a cable 40, said cable passing through the bracket 19 and beneath the pulley 20 and having its other end adjustably connected with a bearing member 4 on the gate post 2 and co-acting with the levers 26 and 27 in supporting the gate 7 in raised position.

When the gate 7 is in normal position as shown in Fig. 1 in the drawings and it is desired to raise the gate on the rod 6 either one of the levers 26 or 27 may be grasped to cause the hand grip thereon to release the dog 32 from engagement with the teeth 23 on the rack frame, at which time the levers may be simultaneously turned about their pivotal connection with the rack frame so that the gate will be raised vertically on the rod 6 through the connection of the cable 40 and link 39 with the lever 26 and gate post 2. When the gate has been adjusted to the desired height on the rod 6, it will be seen that when the operator of the levers 26 and 27 releases his hold upon one of said levers, the spring 33 will restore the locking dog 32 to its normal position, so that the levers will be locked against movement and the gate held in adjusted position upon the rod 6.

Through the connection of the arms 15 with the rod 6, it will be seen that the gate when in raised or lower position may be swung to open position when the occasion requires and that the rollers 17 prevent the arms 15 from binding on the rod when the gate is being raised by the levers 26 and 27 or swung to an open or closed position.

From the foregoing statements, taken in connection with the accompanying drawings, it is at once apparent that a gate has been provided which though simple in construction and inexpensive of manufacture, is highly efficient in use for the purpose set forth.

Having thus described the invention, what is claimed as new, is:

In combination, a gate post, a gate hingedly and slidably connected with said post, a rack frame connected with one side of the gate and having teeth thereon, a bracket connected with the other side of the gate and alining with said rack frame, a shaft mounted to turn in said bracket and rack frame, spaced levers mounted on said shaft, a yoke connecting said levers, a flexible connection between one of said levers, the gate, and said post, a rock shaft carried by said levers, a dog on said rock shaft, a spring connected with said shaft and yoke and adapted to normally hold said dog in engagement with the teeth on the rack frame, and means for releasing said dog from engagement with said teeth connected with the rock shaft and said levers.

In testimony whereof I affix my signature.

ROY GILES.